United States Patent
Yano et al.

[11] 3,953,107
[45] Apr. 27, 1976

[54] ACOUSTO-OPTIC FILTER

[75] Inventors: Tsutomu Yano, Kawasaki; Yasumasa Nabeta, Tokyo; Koetsu Saito, Kawasaki; Akinori Watanabe, Komae, all of Japan

[73] Assignee: Matsushita Electric Industrial Company, Ltd., Osaka, Japan

[22] Filed: July 1, 1974

[21] Appl. No.: 485,002

[30] Foreign Application Priority Data
July 3, 1973 Japan.................................. 48-75583

[52] U.S. Cl................................. 350/149; 350/161
[51] Int. Cl.$^2$.......................... G02F 1/18; G02F 1/32
[58] Field of Search............................. 350/161, 149

[56] References Cited
OTHER PUBLICATIONS
New Noncollinear...Filter..."In Paratellurite"; Yano et al; App. Phy Lt; Vol. 24 No. 6 Mar. 1974; pp. 256–257.

*Primary Examiner*—Vincent P. McGraw
*Attorney, Agent, or Firm*—Stevens, Davis, Miller & Mosher

[57] ABSTRACT

An acousto-optic filter utilizing the far-off-axis anisotropic Bragg diffraction comprising an optically anisotropic crystal in which a light beam of incidence travels in a direction making a large angle with the crystalline axis and an ultrasonic wave travels in a predetermined direction. In the acousto-optic filter using a paratellurite crystal, the wavelength of the visible light is tuned by changing the frequency of the ultrasonic wave in a low frequency range below 100 MHz. The ultrasonic power required for driving the acousto-optic filter is about 1/500 that of the so far known acousto-optic filters. The bandwidth of the transmitted light can be changed from several angstroms to several hundred angstroms by selecting the incident angle of the light.

3 Claims, 8 Drawing Figures

ACOUSTO-OPTIC FILTER

This invention relates to an optical filter for selecting light rays of arbitrary wavelength from incident light rays by appropriately changing the frequency of ultrasonic waves, and more particularly to an acousto-optic filter of this kind capable of changing the spectral width of transmitted rays by appropriately changing the angle of incidence of light rays.

Description of this invention will be made in conjunction with the accompanying drawings in which.

Conventional acousto-optic filters may be broadly divided into two classes; one being called the collinear type and the other called as the non-collinear type. The collinear type represents an acousto-optic filter utilizing an optically anisotropic medium in which light and ultrasonic wave are propagated in same direction to cause interaction therebetween. The non-collinear type was first reported by I. C. Chang of Isomet Co., Ltd. in CLEA (Conference on Laser Engineering and Applications) of IEEE and OSA in 1973, and is an acousto-optic filter utilizing an isotropic or an anisotropic medium in which an ultrasonic wave in a high frequency range above several hundreds MHz is propagated almost normal to incident light to cause interaction therebetween.

Figure 1:
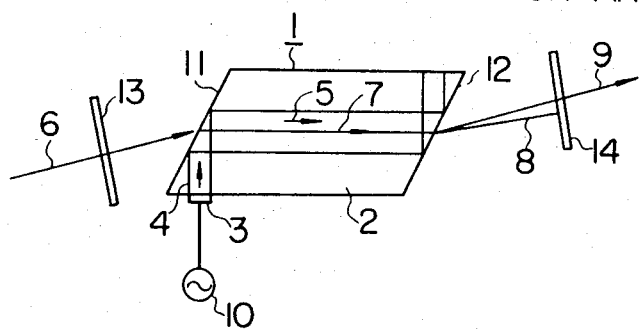
FIG. 1 is a schematic diagram of the structure of a conventional acousto-optic filter.

An example of the collinear type will be described referring to FIG. 1. FIG. 1 shows a so-called transmission type optical filter 1 comprising an acousto-optic medium 2 and a piezoelectric oscillator 3. An electric signal is transduced into an acoustic signal in the piezoelectric transducer 3. Generated ultrasonic waves 4 propagate in the acousto-optic medium 2, are reflected at a terminal surface 11 and transformed into transverse ultrasonic waves 5 propagating in the medium 2. An incident light ray 6 is linearly polarized in a polarizer 13 and refracted at the medium surface to become a light ray 7 propagating along the same line with the ultrasonic waves 5 in the medium 2.

When the relation represented by the following equation (1) holds for transverse ultrasonic waves of a frequency $f_a$ and an acoustic velocity $v$ propagating along the same line with the light ray having a wavelength $\lambda$ in vacuum and if there exists a photoelectric constant relating the two kinds of waves, a diffracted light ray having a polarization 90° rotated from that of the incident light ray is generated.

$$f_a = v(n_i - n_d)/\lambda \tag{1}$$

where $n_i$ and $n_d$ are refractive indices for the incident and diffracted light rays.

A light ray emerging from an end surface 12 is separated into a diffracted ray 9 and a non-diffracted ray 8. The non-diffracted ray 8 is absorbed in an analyzer 14 disposed perpendicular to the polarizer 13. Thus, the analyzer 14 transmits only the diffracted light ray 9.

As can be seen from equation (1), when the frequency of the ultrasonic wave $f_a$ is changed, light of a wavelength corresponding to this change is tuned. By this action, an optical filter can be formed which can select a light ray of an arbitrary wavelength from, for example, a white light ray. Such a filter is called an acousto-optic filter.

In optical filters of this type, the maximum intensity of the diffracted light is obtained at an ultrasonic wave input $P_{a\ max}$ represented by $$P_{a\ max} = \lambda^2 \cdot A/(2 \cdot L^2 \cdot Me) \tag{2},$$

where $\lambda$ is the wavelength of light in vacuum, L the length in which interaction between light and ultrasonic wave occurs, A the cross section of the ultrasonic wave flux propagating in the medium, and Me a figure of merit representing the diffraction efficiency which is preferably as large as possible and differs largely depending on the acousto-optic media. For example, the values for calcium molybdate ($CaMoO_4$) and quartz which are most popularly used in acousto-optic filters are 2.0 and 0.15 × 10$^{-18}$ sec$^3$/g. Thus, the ultrasonic wave input $P_{a\ max}$ becomes as large as 1 W/mm and 13.3 W/mm for the two crystals when L = 1 cm and $\lambda$ = 6328 A. this largeness of $P_{a\ max}$ may lead to heat generation and damage in the element and further requires a large driving power source. These are unfavorable for a practical element.

Further, the spectral bandwidth B.W. of the diffracted light ray in case of filtering light with ultrasonic waves of a single frequency is approximately represented by $$B.W. = 1/(\Delta n \cdot L) \tag{3}.$$

Namely, the band width is reciprocally proportional to the birefringence $\Delta n$ and the mutual interference length L. For the calcium molybdate or quartz noted above, the spectral width is of the order of 10 A for a crystal 3 cm long. There are no other ways to vary the spectral width than to vary the length of the crystal. Namely, the filter characteristics are fixed for a collinear type acousto-optic filter. Thus, when, for example, an intense diffracted light ray is required to be easily obtained from a white light ray even though the spectral band width may be broad, the length of the crystal should be shortened. As can be seen from equation (2), however, when the length of a crystal is shortened, the acoustic wave input, i.e. an electrical input, becomes large inversely proportional to the crystal length.

On the other hand, a large crystal is needed for limiting the spectral width to about 1 A. But it is difficult to obtain a large crystal with good optical characteristics. One of the drawbacks of the collinear type optical filter lies in this point.

In selecting an arbitrary wavelength in the visible light range (0.4 to 0.7 $\mu$m), a wide frequency band of 29 to 90 MHz or 50 to 94 MHz of ultrasonic waves is needed for the two crystals. Because of the band limitation of the transducer itself, single piezoelectric vibration cannot drive the whole desired frequency band. Further, this frequency band of ultrasonic waves for other crystals, for example, lithium niobate ($LiNbO_3$) or lead molybdate ($PbMoO_4$), is as high as above several hundreds MHz. In such case, manufacture of the driving power source and transducer element is difficult.

Next, non-collinear type filters reported by I. C. Chang of Isomet Co., Ltd., will be described.

In this type, an optical filter is formed by utilizing the facts that for a fixed incident angle $\theta_0$ of a light ray the frequency band width due to the deviation from the Bragg angle for a particular incident light wavelength $\lambda_o$ becomes narrow in a high frequency range as is represented by equation (4), and that for a different light wavelength $\lambda_1$, the frequency of ultrasonic wave $f_1$, the Bragg angle for which a coincides with said incident angle becomes different.

$$\Delta f \approx 1.8\, n_0 v^2 \cos \theta_o / \lambda_o f_o L \tag{4}$$

$$\sin \theta_o \approx \frac{\lambda_o}{2 n_o \cdot v} \cdot f_o = \frac{\lambda_1}{2 n_1 v} f_1 \tag{5}$$

Here, $n_o$, $n_1$ are the refractive indices of the medium at light wavelengths $\lambda_o$ and $\lambda_1$ and $f_o$, $f_1$ the ultrasonic wave frequencies satisfying the Bragg angle $\theta_o$ at said wavelengths.

The spectral width of the transmitted light ray becomes narrower and the color purity becomes better as $\Delta f$ becomes smaller. Thus, the medium should preferably have smaller refractive index and smaller acoustic velocity. For example, it is reported that in the case of using the direction of the smallest acoustic velocity in a paratellurite single crystal, when the ultrasonic wave frequency is varied from 300 MHz to about 400 MHz, the selected light wavelength varies from 6328 A to 4880 A with a spectral width of 30 A at 6328 A. Here, $\Delta f$ is 0.8 MHz at 300 MHz.

In this non-collinear type acousto-optic filter even a medium having an acoustic velocity as small as one third to one fifth of the ordinary one such as paratellurite still requires driving of high frequency ultrasonic waves at above 300 MHz. Other materials naturally require higher frequencies. Therefore, the manufacture of a driving power source and a piezoelectric oscillator becomes difficult. Further, attenuation of ultrasonic waves is large at such high frequencies, e.g. about 3 dB/cm at 100 MHz and 27 dB/cm at 300 MHz. Thus, there arise such serious practical inconveniences as heat generation in the element and the need for limiting the beam diameter of the light ray.

As has been described above, conventional acousto-optic filters have many drawbacks.

This invention provides a very useful and novel non-collinear type acousto-optic filter capable of acting in the low frequency region and thereby avoiding the conventional drawbacks.

Although the above-mentioned conventional acousto-optic filters of both the collinear and the non-collinear type utilized such anisotropic Bragg diffractions which occur in directions almost parallel to the axis among the anisotropic Bragg diffractions, this invention utilizes such Bragg diffraction phenomena occurring in directions oblique to the optical axis which are remarkable in paratellurite single crystal (which will be referred to as far-off-axis anisotropic Bragg diffraction hereinafter), and provides a practical acousto-optic filter by the non-collinear action.

Figure 2:
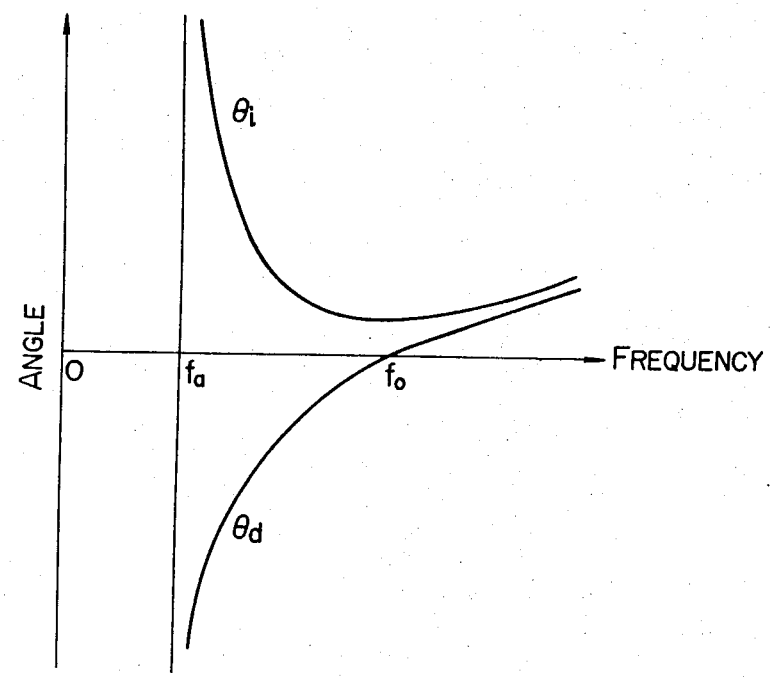
FIGS. 2 and 3 are characteristic diagrams of an acousto-optical material.

Paratellurite single crystal has been known to have a large figure of merit 793 × $10^{-18}$ sec³/g when a transversely ultrasonic wave with displacement direction $<\bar{1}10>$ is propagated along the $<110>$ direction and the incident light ray is propagated along the $<001>$ direction and to be an optically active crystal having a large optical activity for a light ray propagating along the $<001>$ direction. On the other hand, when there exist two phase velocities of light for the direction normal to the wave front, the diffraction of light with a transverse ultrasonic wave is generally called the anisotropic Bragg diffraction since the angles of incidence and diffraction of light are different. The minimum frequency for generating this phenomenon is $f_a$ shown in equation (1). At this point, the angles of incidence and diffraction of light with respect to the ultrasonic wave front are 90° and −90°. It is known that these angles vary as shown in FIG. 2 as the frequency increases. In FIG. 2, the frequency $f_o$ is the value defined by $$f_o = \frac{v}{\lambda} \left\{ 2 n_i (n_i - n_d) \right\}^{1/2}.$$

At this frequency, angle of incidence becomes minimum. The minimum angle in which the incident angle of incidence is around several degrees with respect to the ultrasonic wave front has been utilized in the well known diffraction phenomena in tellurium dioxide. This is called the near-by-axis anisotropic Bragg diffraction in this specification.

Figure 3:
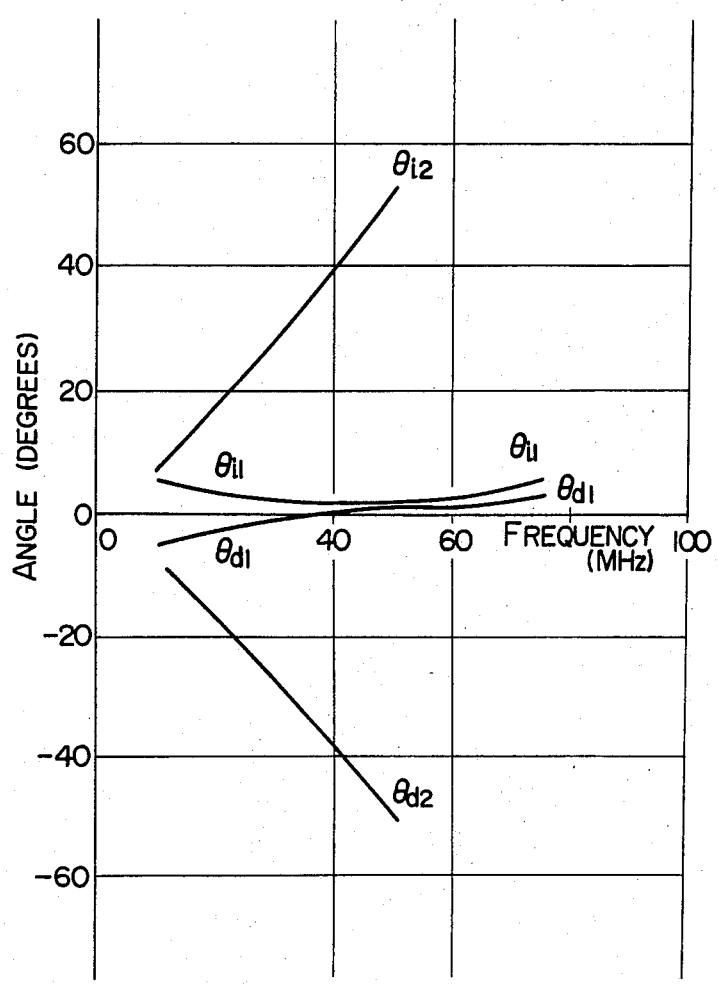

The present inventors have found that in paratellurite single crystal when light and ultrasonic wave are interacted non-collinearly the frequency dependance of the angles of incidence and diffraction varies as shown in FIG. 3. Namely, for one circularly polarized incident light, two Bragg angles exist at the same frequency. In FIG. 3, letters $\theta_{i1}$ and $\theta_{d1}$ correspond to the incident angle and the diffraction angle of FIG. 2, and $\theta_{i2}$ and $\theta_{d2}$ are those newly found by the present inventors in which both the incident light and the diffracted light propagate in directions being far from the optic axis. This will be referred to as the far-off-axis anisotropic Bragg diffraction.

In addition to the above properties, the present inventors have also found further new facts. Firstly, the figure of merit for diffraction efficiency in paratellurite single crystal becomes about 1200 × $10^{-18}$ sec³/g for circularly polarized light, which is about one and a half times as large as the conventional value. For linearly polarized incident light having an angle of incidence within about 5° with respect to the optic axis outside the crystal, the figure of merit is apparently 600 to 800 × $10^{-18}$ sec³/g and the diffracted light intensity can amount to only 50 percent of the incident light at the maximum. Secondly, on the other hand, when the angle of incidence is slanted above 10° from the optic axis, a diffraction efficiency of approximately 100 percent can be obtained even for a linearly polarized incident light and also the figure of merit is about 1200 × $10^{-18}$ sec³/g.

This invention is made on the basis of the newly found phenomena in the paratellurite single crystal as described above.

An object of this invention is to provide an acousto-optic filter of high efficiency operable in the low frequency region.

Another object of this invention is to provide an acousto-optic filter capable of tuning light in the visible range with ultrasonic waves in a narrow band width.

A further object of this invention is to provide an acousto-optic filter capable of giving the maximum diffraction efficiency at a very small ultrasonic wave input, utilizing a paratellurite single crystal as the medium.

Description will be made of a preferred embodiment hereinbelow by referring to the accompanying drawings.

Figure 4:
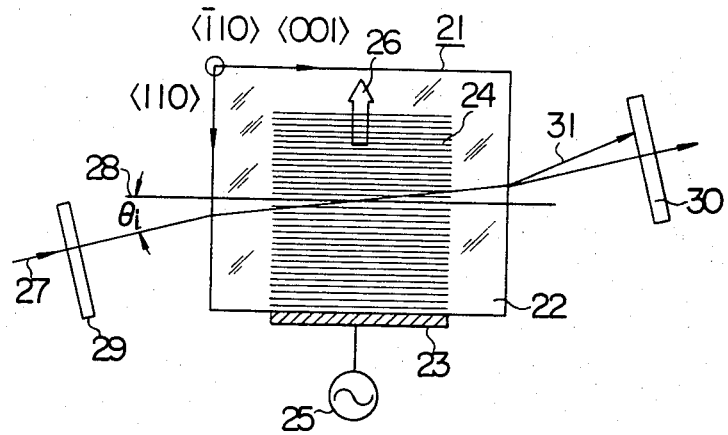
FIG. 4 is a schematic diagram of a basic embodiment of an acousto-optic filter according to this invention.

In FIG. 4, a filter 21 comprises a paratellurite single crystal 22 and an ultrasonic wave transducer 23 which is bonded to a (110) surface (i.e. a surface normal to the <110> direction) of the paratellurite single crystal. The transducer 23 transduces an electric signal 25 into ultrasonic waves 24 which propagate in the crystal along an arrow 26. A light ray 27 is injected into the crystal with a slant angle ($\theta_i$) of above about 10° from the ultrasonic wave front 28. Further, there are shown a polarizer 29, an analyzer 30 and diffracted light rays 31.

In a paratellurite single crystal, linearly polarized light incident parallel to the optic axis is separated into two circularly polarized light rays having clockwise and counterclockwise polarization rotations due to the large optical activity and propagates in the crystal. However, light rays propagating in a direction slanted more than about 5° from the optic axis in the crystal are not circularly polarized but are elliptically polarized close to linear polarization. For example, light of a wavelength 6328 A injected at an incident angle of 18° from the optic axis outside the crystal propagates with an incident angle of about 8° in the crystal. Here, the ellipticity is of the order of 0.06. When the incident polarization direction is in the <110> direction the intensity ratio of clockwise and counter-clockwise polarization rotation light becomes 300 to 1. Thus, it can be seen that only one polarization light propagates in the crystal. Further, the figure of merit for diffraction efficiency in this case is about $1200 \times 10^{-18}$ sec$^3$/g as the result of measurement, which is still as large as that of circularly polarized light propagating along the optic axis.

Figure 5:
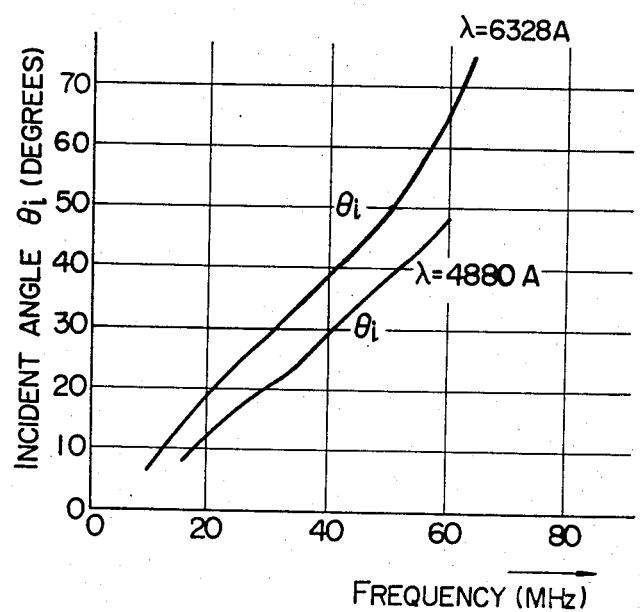
FIG. 5 is a characteristic diagram of the filter of FIG. 4.

FIG. 5 shows the relation of the frequency and the angle of incidence (outside the crystal) satisfying the Bragg angle for different light wavelengths. As can be seen from FIG. 5, when the angle of incidence outside the crystal is fixed at 20° from the optic axis, light of wavelengths 6328 A and 4880 A are selected with ultrasonic waves of 21 MHz and 30 MHz. When the incident angle is set at 50°, light of wavelengths 6328 A and 4880 A are selected with ultrasonic waves of about 50 MHz and 70 MHz. Table 1 shows the relation among the incident angle, the frequency and the spectral bandwidth.

Table 1

Relation of the incident angle and the frequency of ultrasonic wave for light having a wavelength of λ=6328 A

| Incident angle | | Frequency (MHz) | Δf (MHz) | Spectral width of transmitted light (A) |
|---|---|---|---|---|
| Outside | Inside | | | |
| 20° | 8° 40' | 22 | 0.37 | 106 |
| 30° | 13° | 32 | 0.25 | 49 |
| 40° | 16° 30' | 42 | 0.2 | 30 |
| 50° | 19° 50' | 50 | 0.16 | 21 |
| 60° | 22° 30' | 56 | 0.145 | 16 |
| 70° | 24° 40' | 61 | 0.13 | 14 |

Table 1-continued

Relation of the incident angle and the frequency of ultrasonic wave for light having a wavelength of λ=6328 A

| Incident angle | | Frequency (MHz) | Δf (MHz) | Spectral width of transmitted light (A) |
|---|---|---|---|---|
| Outside | Inside | | | |
| — | 30° | 74 | 0.10 | 8 |

Crystal length 1 cm

Figure 6A:
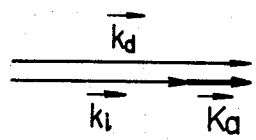
FIGS. 6a, 6b and 6c are diagrams showing the relation of wave vectors for illustrating the differences between the filter according to this invention and conventional filters.
Figure 6B:
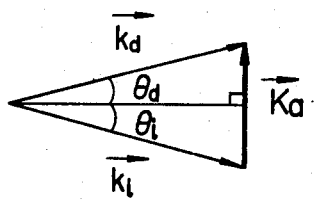
Figure 6C:
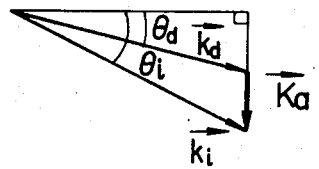

The differences among the present acousto-optic filter utilizing far-off-axis anisotropic Bragg diffraction, the conventional collinear type acousto-optic filter and the conventional non-collinear type acousto-optic filter of Isomet Co., Ltd. are readily comprehended by referring to the relation of the wave vectors of acoustic wave ($\vec{k_a}$), incident light ($\vec{k_i}$) and diffracted light ($\vec{k_d}$). FIGS. 6a, 6b and 6c show the wave vector relations for the collinear type filter, the non-collinear type filter of Isomet Co., Ltd. and the present non-collinear type filter. In the collinear type filter, the acoustic wave vector ($\vec{k_a}$) and the light vectors ($\vec{k_i}$, $\vec{k_d}$) are parallel to one another. In the "Isomet" type, the directions of propagation for the incident and diffracted lights ($\vec{k_i}$, $\vec{k_d}$) lie on the opposite side of the wave front of the acoustic wave with approximately equal angles (this is equivalent to the anisotropic Bragg diffraction in isotropic media). On the other hand, according to the present acousto-optic filter the directions of propagation for the incident and diffracted light ($\vec{k_i}$, $\vec{k_d}$) lie on the same side of the wave front of the acoustic wave and further the angles of incidence $\theta_i$ and diffraction $\theta_d$ are not equal. A further feature of the present acousto-optic filter lies in utilization of the transverse acoustic wave. The phenomenon of far-off-axis anisotropic Bragg diffraction has only been observed phenomenologically in quartz as a large angle branch due to a longitudinal acoustic wave. In paratellurite, however, such a phenomonon cannot occur with longitudinal acoustic waves but with transverse acoustic waves. Especially, far-off axis anisotropic Bragg diffraction utilizing waves having an oscillating displacement along the <$\bar{1}$10> direction and propagating along the <110> direction is very effective for forming an acousto-optic filter.

Further, one of the large differences from the acousto-optic filter reported by Isomet Co., Ltd. of the same non-collinear type exists in the frequency range of the ultrasonic wave. For example in the case of using paratellurite, for obtaining a light spectral bandwidth of 20 A at 6328 A, an ultrasonic wave of about 50 MHz is sufficient in this embodiment, whereas an ultrasonic wave of about 270 MHz (more than five times as large as the present value) is needed for the Isomet type filter of similar dimensions. An ultrasonic wave generator of such high frequency is difficult to fabricate.

As has been described above, the acousto-optic filter according to this embodiment differs largely from the conventional ones and provides following large effects when an appropriate material such as a paratellurite single crystal is used.

1. Drive can be provided with an electric power input as small as about 1/600 compared to the value for $CaMoO_4$ which has been used often in conventional devices. This permits miniaturization of the device, simplification of the drive circuit, and provides stable operational characteristics due to small heat generation in the device.

2. The spectral bandwidth of the transmitted light can be arbitrarily varied by varying the angle of incidence. Spectral widths of several angstroms to several hundreds angstroms can be easily provided even with a small crystal.

3. The frequency range of the ultrasonic wave required for selecting light in the visible light region is so narrow that simplification of the drive circuit and drive with a single transducer become possible.

4. The driving frequencies lie in a relatively low frequency region below about 100 MHz, and thus the fabrication of a transducer and a drive circuit becomes easy.

5. The shape of the device is simple and the fabrication is easy.

6 In the case of using a paratellurite single crystal, the optically transparent region extends from 0.35 to 5 $\mu$m. Thus, light filtering action to shorter wavelengths becomes possible compared to the case of $CaMoO_4$.

Although the above description has been based on the embodiment employing paratellurite single crystal which can most effectively utilize the present invention, the present invention can be effectively applied to other materials having an optical activity, for example quartz. In the case of quartz and linearly polarized incident light, the angle of incidence of light is preferably about 60° with respect to the optic axis.

As is described above, according to this invention, an ultrasonic wave is propagated in a medium in which light has two different phase velocities in the propagating direction and light is injected into the medium so as to cause far-off-axis diffraction phenomenon with the ultrasonic wave, and thereby an effective acousto-optic filter of a narrow spectral bandwidth can be provided at a low driving frequency.

What we claim is:

1. An acousto-optic filter comprising:
   a medium in which light has two different phase velocities in a propagating direction, means for propagating an ultrasonic wave in said medium, and
   means for injecting a light beam into said medium so as to cause far-off-axis anisotropic Bragg diffraction with said ultrasonic wave.

2. An acousto-optic filter according to claim 1, wherein said medium is a paratellurite single crystal.

3. An acousto-optic filter according to claim 2, wherein the ultrasonic wave is propagated in the <110> direction of the paratellurite single crystal and a light beam is injected at an angle of more than five degrees with respect to the <001> direction of the crystal.

* * * * *